(No Model.)

J. H. WESTCOTT.
DRILL CHUCK.

No. 527,227. Patented Oct. 9, 1894.

WITNESSES:
C. L. Bendixon
Charles E. Stevens

INVENTOR:
James H. Westcott
By E. Laass
his ATTORNEY

UNITED STATES PATENT OFFICE.

JAMES H. WESTCOTT, OF ONEIDA, NEW YORK, ASSIGNOR OF ONE-HALF TO THE WESTCOTT CHUCK COMPANY, OF SAME PLACE.

DRILL-CHUCK.

SPECIFICATION forming part of Letters Patent No. 527,227, dated October 9, 1894.

Application filed June 18, 1894. Serial No. 514,891. (No model.)

*To all whom it may concern:*

Be it known that I, JAMES H. WESTCOTT, of Oneida, in the county of Madison, in the State of New York, have invented new and useful Improvements in Drill-Chucks, of which the following, taken in connection with the accompanying drawings, is a full, clear, and exact description.

This invention relates to the class of chucks which are provided with a diametric groove in the face of the chuck-body in which groove are seated the jaws, which, by means of a right and left screw engaging correspondingly screw-threaded grooves in corresponding sides of the jaws, are moved synchronously either toward or from each other to grip or release the shank of the drill or other tool inserted between said jaws. In practice it has been found that the tightening of the grip of the jaws upon the drill or tool by the single screw engaging the jaws at one side of the axis of the chuck, subjects the entire chuck to a severe torsional strain which tends to crowd the jaws out of line with each other and break the chuck-body and bend or injure the screw.

The object of this invention is to effectually obviate such injurious results; and to that end the invention consists essentially in the combination with a drill-chuck or analogous tool having gripping jaws disposed adjustably opposite each other and a screw engaging the jaws at one side thereof for moving them toward and from each other, of a brace on the opposite side of the jaws adjustably tying them together and thereby equalizing the strains at opposite sides of the axis of the chuck and maintaining the jaws in line with each other during the operation of the chuck, all as hereinafter more fully described and specifically set forth in the claims.

Figure 3:
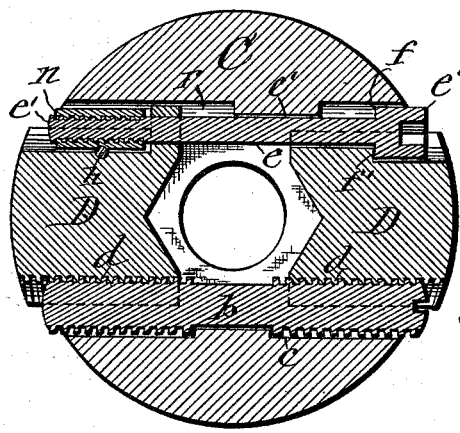
Figure 4:
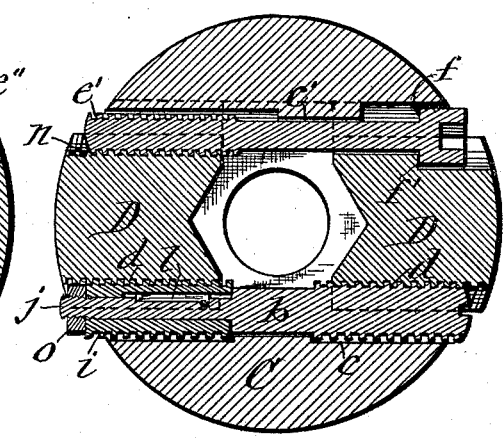
Figure 1:
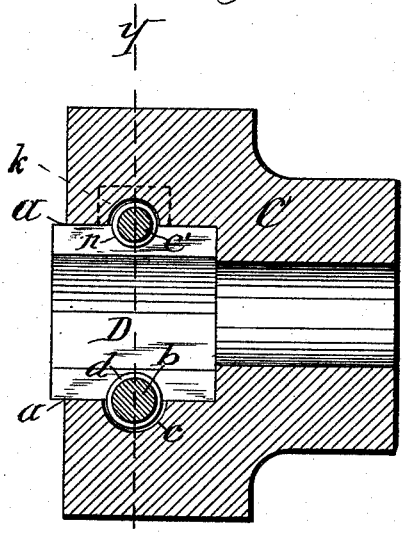
Figure 2:
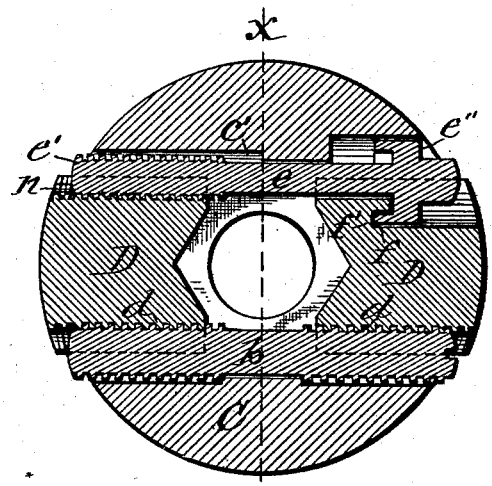
Figure 5:
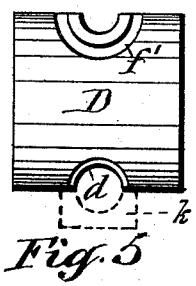

In the annexed drawings Figure 1 is a longitudinal section on line —X—X— in Fig. 2. Fig. 2 is a transverse section on line —Y—Y— in Fig. 1. Figs. 3 and 4 are transverse sections in the same plane illustrating specific improvements in the details of the chuck, and Fig. 5 is an outer side view of one of the jaws.

Similar letters of reference indicate corresponding parts.

—C— represents the body of the chuck which is provided with the usual diametric groove —a— in which are seated the jaws —D—D— for gripping the shank of the drill or analogous tool. Said jaws are moved synchronously from and toward each other to receive and grip the aforesaid shank between them, which movement is effected by a right and left screw —b— seated in a smooth channel —c— in one side of the groove —a— and engaging correspondingly screw-threaded channels —d— in the adjacent sides of the jaws in the usual and well known manner.

The force of the screw at one side of the axis of the chuck in forcing the jaws to firmly grip the drill shank, subjects the chuck to severe torsional strain as hereinbefore stated, and to obviate this strain, I employ a brace or tie which adjustably ties the jaws together at the opposite side of the axis of the chuck, which tie is susceptible of modifications in its detail construction and I therefore do not limit myself in this respect. I preferably employ for this brace or tie, a screw —e—, the main portion of which is of a plain cylindrical form. One end thereof is screw-threaded as at —e'— and the opposite end is provided with a head —e''— having a square shoulder —f— by which it abuts against a corresponding shoulder —f'— on one of the jaws. This screw is seated in a smooth channel —c'— in the side of the groove —a— and in the side of the shouldered jaw, and its threaded end portion engages a nut —n— formed either directly in the side of the jaw as shown in Figs. 2 and 4 of the drawings, or in a lug —k— projecting from the side of the jaw as indicated by dotted lines in Figs. 1 and 5 or formed separately from the jaw and secured in a socket or recess —r— in said jaw as represented in Fig. 3 of the drawings, which shows said nut of the form of an internally screw-threaded sleeve embracing the screw —e— and fastened to the jaw by a key —h—. By the employment of said sleeve, I obtain a better hold for the screw-threads and a better bearing on the jaw.

In order to permit the right and left screw —b— to be adjusted to obtain a greater gripping hold of the jaws, I form the screw-threaded portion of one end of the right and left screw of an externally screw-threaded sleeve —i— which is secured to a cylindrical end-portion —j— of the screw —b— by a key —l— and confined longitudinally adjustable by a nut —o— as shown in Fig. 4 of the drawings, the latter nut having a finer thread than the sleeve —i— and working on a corresponding thread on the portion —j—. By loosening said nut while turning the screw so as to cause the jaws to grip the drill, and then tightening the nut —o—, the sleeve —i— is forced longitudinally so as to cause the sleeve to exert further force on the jaw.

In adjusting the chuck for gripping the drill-shank, said shank is inserted between the jaws —D—D— and then the right and left screw is operated to move the jaws toward each other and grip the drill between them. Then the screw —e— on the opposite sides of the jaws is turned to firmly tie the jaws thereat together and maintain them in line with each other and equalize the strains at opposite sides of the axis of the chuck which is thereby greatly relieved of torsional strain during the operation of the chuck.

What I claim as my invention is—

1. A drill-chuck having jaws movable toward and from each other and an adjusting screw engaging said jaws at one side, and a supplemental brace seated movably in the chuck-body at the opposite side of the jaws and adjustably engaging the jaws endwise to move the same toward and from each other independent of the adjusting screw and equalizing the strain at opposite sides of the jaws as set forth.

2. The combination of a chuck-body provided with a diametrical groove and with smooth channels in both sides of said groove and parallel therewith, jaws sustained longitudinally movable in the diametrical groove at opposite sides of the axis of the body and provided with screw-threaded channels directly opposite the aforesaid smooth channels, and screws working in said channels whereby the strains upon opposite sides of the jaws are equalized as set forth.

3. The combination of the chuck-body provided with a diametrical groove and with smooth channels in the sides of said groove and parallel therewith, jaws sliding in the aforesaid groove, one of said jaws being provided with screw-threaded channels in both sides, and the other of said jaws being provided with a smooth channel in one side and with a screw-threaded channel in the opposite side and having its threads pitched reverse from the threads of the channels in the same side of the other jaw, a right and left screw working in the latter channels, and a screw engaging the screw-threaded channel in the opposite side of one of the jaws and sliding in the smooth channel of the companion jaw and shouldered on said jaw to obtain a hold thereon for tying the two jaws together as and for the purpose set forth.

4. The combination of the chuck-body provided with a diametric groove and with smooth channels in the sides of said groove and parallel therewith, jaws sliding in said groove and having in one of their corresponding sides, screw-threaded channels pitched in opposite directions from each other and smooth channels in the opposite side, a right and left screw working in the screw threaded channels, an internally screw-threaded sleeve in one of said smooth channels, a key securing said sleeve to the jaw, and a screw working in said sleeve, and having a smooth shank in the smooth channel of the other jaw and shouldered thereon as set forth.

5. The combination of the chuck-body provided with a diametric groove and provided in one side of said groove with a smooth channel parallel therewith, jaws sliding in said groove and provided respectively with right and left screw-threaded channels, an externally screw-threaded sleeve in one of said channels, and a screw working in the other screw-threaded channel and detachably secured in the aforesaid sleeve as set forth.

In testimony whereof I have hereunto signed my name this 1st day of June, 1894.

JAMES H. WESTCOTT. [L. S.]

Witnesses:
JOHN J. LAASS,
CHARLES E. STEVENS.